Figure 1:
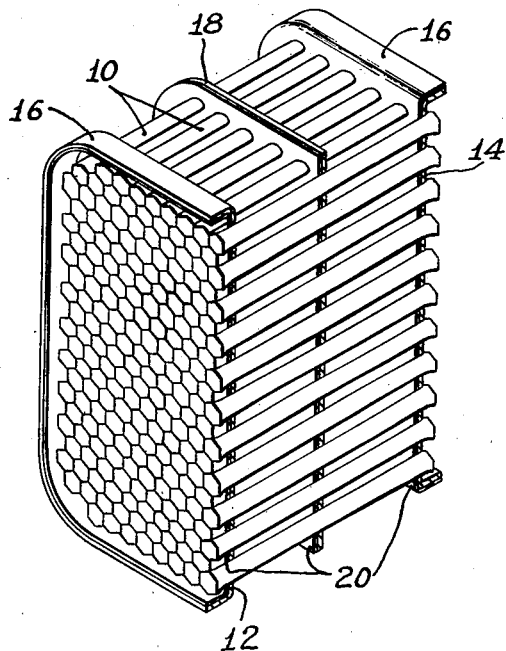

Oct. 13, 1942.  J. E. WOODS  2,298,996
HEAT EXCHANGE APPARATUS
Filed April 22, 1941   2 Sheets-Sheet 1

Witness
Charles J. Olson

Inventor
John E. Woods
by his attorneys
Fish Hildreth Cary Jenney

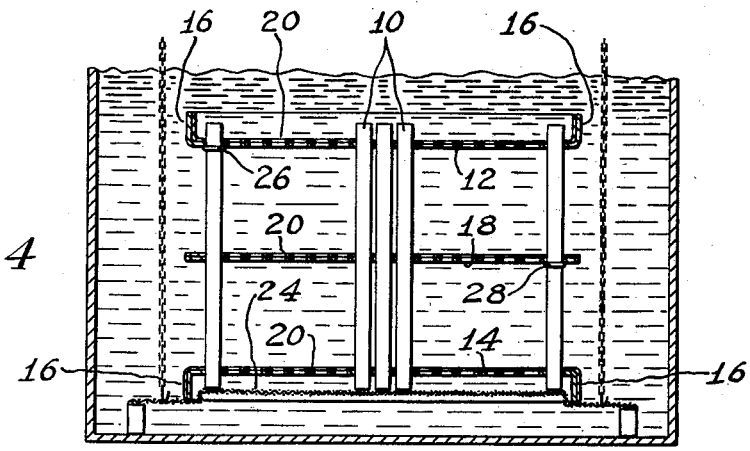
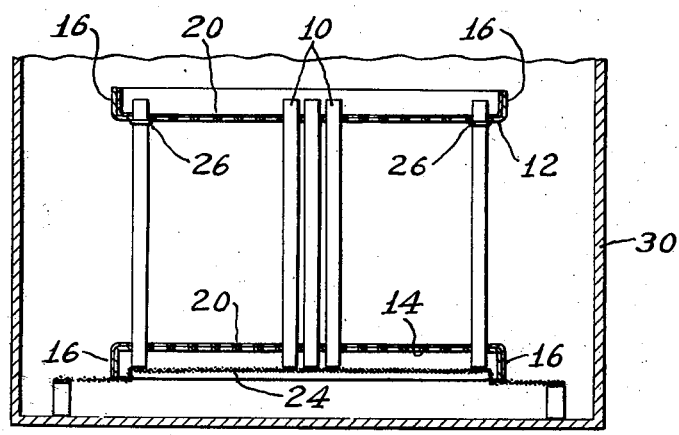
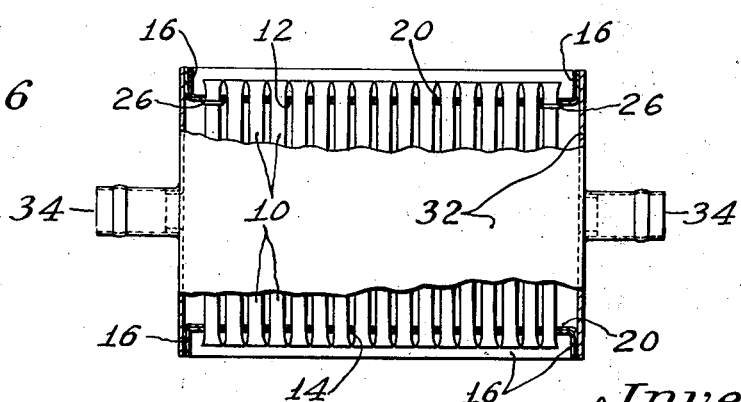

Patented Oct. 13, 1942

2,298,996

UNITED STATES PATENT OFFICE 2,298,996

HEAT EXCHANGE APPARATUS

John E. Woods, Brookline, Mass., assignor to Clifford Manufacturing Co., Boston, Mass., a corporation of Delaware Application April 22, 1941, Serial No. 389,769

1 Claim. (Cl. 257—128)

The present invention relates to heat exchange apparatus, and is more particularly concerned with heat exchange apparatus employing closely spaced thin-wall tubes, useful as radiators, oil coolers, inter-coolers, and the like.

Apparatus of this type has ordinarily been made by assembling hexed end tubes (usually of copper) in a honeycomb bundle and soldering the hexed ends together, usually by dipping in soft solder. The tanks or casings are attached to the outside tubes of the bundle, also by soft solder.

By soft solder is meant any of the commercially available solders having melting points approximately in the range of 381° to 595° F. The apparatus manufactured with soft solder has a number of serious limitations. The joints between the tube ends do not afford sufficient structural strength and rigidity for the assembly. Mechanical stresses applied to the casings are communicated to the tube joints, particularly those of the outside rows, and result in the appearance of leaks. These mechanical stresses are frequently due to vibration effects, since apparatus of this kind finds its most important use in the aircraft industry. Furthermore, it is frequently desired to use apparatus of this kind with fluids at temperatures above the melting point of the solder.

One of the principal reasons for the use of soft solder is to prevent destruction of the tubes in the dipping operation. Hard or high melting solders or brazing compounds, with melting points ranging from 1175° to 1600° F., are commercially available, but the manufacture of heat exchangers from thin-wall tubes by the use of such solders is not feasible because the dipping operation in a bath of such material would result in immediate destruction of the thin tube ends by dissolution in the large mass of brazing compound.

The difficulties noted above are even greater in the case of aluminum, which would be highly desirable because of its light weight in the manufacture of equipment for use in aircraft. The only available brazing alloys for use with aluminum have melting points of the order of only 100° F. lower than that of the aluminum itself, and any standard soldering or brazing operation by dipping or otherwise can not be carried out without immediate destruction of the tubes. As a consequence, no successful manufacture of heat exchangers with thin-wall tubes has heretofore been carried out.

According to the present invention, heat exchange apparatus is constructed of thin-wall closely spaced tubes by assembling the tubes in relatively heavy headers which contribute markedly to the strength and rigidity of the assembly, bonding the tubes to the headers, and securing the headers to a heavy and structurally strong tank or casing. This construction is applicable to copper, aluminum, and other non-ferrous metals or alloys, as desired, and has been found to avoid most of the disadvantages inherent in the earlier construction.

The tubes are straight, and of uniform diameter, and are therefore relatively inexpensive, not only because of the small number of manufacturing operations required, but also because they are not subjected to damage by initial hexing or bulging operations. The mechanical stresses applied to the tanks are taken up by the heavy headers and are not directly communicated to the tube assembly, as will appear in the specific description.

Although header constructions are not new, their use has been mainly limited to boilers, economizers, etc., employing thick tubes which may be expanded into the headers. Such expanding operations are not feasible with thin-wall tubes, with which the present invention is concerned. By thin-wall tubes is meant tubes which are usually of the order of .005" and in no case greater than 1/64" in wall thickness.

Header constructions have also been proposed for widely spaced tubes, in which the tubes may be securely supported in drifted or flanged holes. This construction is likewise not feasible for closely spaced tubes, wherein the distance between tube centers in any row is only slightly greater than the tube diameter. So far as I am aware, no header construction with closely spaced thin-wall tubes has heretofore been successfully made.

Preferably the tubes are secured to the headers by brazing or hard soldering, and one feature of the invention contemplates the use of a brazing or soldering compound in measured amounts, sufficient to establish an adequate bond, but without danger of tube destruction in the process of manufacture. The hard solder bonds are important in enhancing the strength of the apparatus and they place no limitations on the temperatures of the fluids which can be handled by the equipment. The invention is applicable to aluminum as well as copper tubes.

Other features of the invention consist of certain novel combinations and arrangements of parts hereinafter described and particularly defined in the claim.

Figure 2:
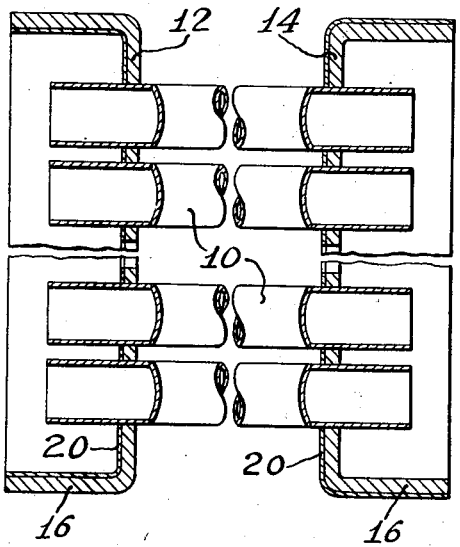
Figure 3:
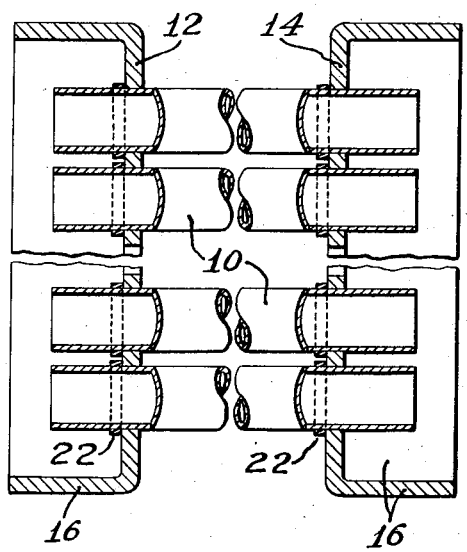

In the accompanying drawings, Fig. 1 is a perspective view of a core assembly according to the present invention; Fig. 2 is a detail view illustrating one method of assembling the tubes and headers; Fig. 3 is a detail view illustrating another method of assembling the tubes and headers; Fig. 4 is a diagrammatic view showing one method of carrying out the brazing operation; Fig. 5 shows another method of carrying out the brazing operation; and Fig. 6 is a sectional view of the complete assembly.

In the illustrated embodiment of the invention, the tubes 10, which are drawn or extruded from copper, brass, aluminum, aluminum alloy or other non-ferrous metal, are inserted in closely spaced punched holes in the headers 12 and 14. The tubes are of thin-wall structure on the order of .005" to .007" in wall thickness. The headers are either of the same material as the tubes or of material compatible therewith. For example, brass, copper or monel headers may be used with copper tubes, and aluminum or aluminum alloy headers with aluminum tubes. The headers comprise flat sheets provided with peripheral flanges 16 to stiffen the sheets and provide for attachment to the shell or tank. The tube receiving holes in the headers are closely spaced, the spacing between holes in any row being only slightly greater than the tube diameter. As an example, one construction in commercial use employs tubes .268" in diameter spaced .313" on centers.

When the tubes are long, say over 9" in length, an intermediate support is preferably provided by an intermediate plate 18 (Fig. 1), of the same type as the headers 12 and 14. As shown, the plate is without a peripheral flange, but one may be used for increased strength, if desired. In apparatus of the conventional headerless type, the intermediate support has been provided by forming small bulges in the intermediate portions of the individual tubes so that the bulges of adjacent tubes contact one another, but that method is unduly expensive. In the present invention, one or more intermediate supporting plates may be easily included in the assembly. The headers and intermediate plates are supported the proper distance apart in a suitable jig, with the holes in register, and the tubes are passed through the holes. The end portions of the tubes protrude uniformly, as shown in Figs. 2 and 3.

For the bonding of the tubes to the headers, a measured amount of high melting brazing compound is provided at the joints. The brazing compound is only sufficient in amount to afford the proper alloying action and penetration of the compound into the material of the tubes and headers, but without danger of tube destruction. The invention provides alternative methods for accomplishing this result, as shown in Figs. 2 and 3.

In Fig. 2, each header is provided on one or both sides with a thin coating 20 of brazing compound. For a copper assembly, this in the form of a thin sheet of silver alloy or silver solder having a melting point of 1175° F., or perhaps somewhat higher. The coating is rolled on the sheet and forms an integral part thereof, after the manner of platers' metal. The coating is preferably applied before the holes are punched, to avoid the necessity of handling a thin sheet of brazing material and making it register properly with previously punched holes in the header sheet. In the case of aluminum equipment, the headers are preferably made of "Alclad," having one or both surfaces thinly coated with aluminum brazing compound.

If the headers are coated on one side only, as illustrated in Fig. 2, the headers 12 and 14 for the opposite ends of the assembly are initially formed with the flanges extending in opposite directions, so that when the unit is later heated for brazing, the alloy coating is on the top side of each header.

An alternative, and in some respects preferable method of applying the brazing compound is shown in Fig. 3. Small ferrules or thimbles 22 of appropriate brazing compound are placed on the tubes at the time the tubes are assembled in the headers. As shown in this figure, these ferrules are all on the same side of the several headers, so that when the unit is suspended vertically and subjected to heat, the brazing material will melt and flow by gravity into the joints between the tubes and headers.

Similar provisions may be made for bonding the tubes to the intermediate plate 18, if one is used.

The assembly is then placed in a brazing oven or dipped in molten flux, with the tubes vertical and with the thimbles or the coated surfaces of the header plates uppermost, and the entire assembly is brought to a temperature sufficient to melt the brazing compound. During the heating operation, the lower header and the tubes are supported on a screen or perforated grid 24, of a shape to maintain the tubes in proper relation to the header. The upper header and the intermediate plate 18 are supported by a few beaded tubes 26, 28, inserted at the start of the tube-assembling operation.

The heating operation by dipping in flux is shown in Fig. 4. The assembly is first preheated by holding it in a closed space above the molten flux, in order to avoid solidifying the flux when the assembly is immersed therein. After immersion, the flux flows into and through the tubes and brings the parts to a temperature sufficient to melt the brazing compound, which runs into the joints between the tubes and headers. The flux also performs its usual function of removing oxide from the surfaces.

In the method of Fig. 5, the assembly is supported on the grid 24 in a brazing oven 30, and the tubes are heated by circulation of hot air therethrough. The joints are sprayed or brushed with fluxing compound before heating.

In either heating method (Fig. 4 or Fig. 5), the brazing compound seals the joints between the tubes and headers. Since the brazing compound is on the upper side of each header, proper flow of compound into and around the tube joints by gravity is assured.

The method is advantageous in that it provides a heavy header construction in which all of the joints are formed by a hard solder or brazing alloy, as distinguished from the soft solder method commonly used on hexed tubes. In the present invention, the amount of brazing compound is only sufficient to insure penetration thereof into the tube walls to an extent to form proper bonds, but without danger of tube destruction.

After removal from the brazing furnace or dipping bath, means are provided to reduce the head resistance of the tubes. This is most conveniently accomplished by hexing the tube ends, as shown in Figs. 1 and 6. The hexing is preferably done with a gang hexing tool, which forms the ends of a number of the tubes simultaneously. Although some of the tube ends may be split by this operation, the splits are of no consequence, since the only purpose of the hexing operation is to enlarge the face area, no reliance being placed on the hexed ends for fluid seals or structural rigidity.

The tank or shell 32 (Fig. 6), having the usual fluid inlet and outlet connections 34, is preferably applied as the final step. The tank is placed over the tube and header assembly and is securely attached to the header flanges 16, conveniently by torch brazing. Since the tank is attached to the headers, instead of to the relatively fragile tubes, it is unnecessary to rely on soft solder. Owing to the thickness of the header and tank material, the connection may be made with hard solder or brazing compound, without damage. If desired, the attaching operation may be carried out by line welding, either instead of or in addition to the brazing process.

The steps above described need not be carried out in exact order specified. The tank may, for example, be brazed to the headers during the operation of Fig. 4 or Fig. 5, in which case the headers are preferably provided with coatings of brazing material on both sides, so that such material is present on the outside surface of the flanges 16. Thus the bonds between the tank and the headers are formed at the same time as the bonds between the tubes and headers. As another example of changing the order of operations, the hexing of the tube ends may be performed after the attachment of the tank.

Heat exchange apparatus made according to the present invention is characterized by great structural strength and rigidity. Mechanical stresses applied to the structure, by vibration or otherwise, are borne by the heavy tank and headers and are not communicated to the tubes or to the joints between the tubes and headers. The bonds between the tubes and headers, and between the headers and tank, have high mechanical strength and are of sufficiently high melting point to permit use of the equipment under the most severe temperature conditions. Furthermore, such equipment is not limited to copper constructions, but may be used with other materials, notably aluminum, which is advantageous because of its light weight.

The intermediate plate 18, which has been described as a tube-supporting plate, may also be used as a baffle or bulkhead. One or more of such plates may be employed for baffling purposes, and may be of such contours as to direct the flow of fluid in any desired manner externally of the tubes. It will be understood that baffles or intermediate plates cannot be used in the conventional construction employing tubes which are necessarily expanded at their ends before assembly. In the present case, where tubes of uniform cross section are used (except for a relatively small number of tubes with single bulges 28 for supporting purposes), the assembly with baffles and intermediate plates of any desired number and configuration presents no difficulty.

Having described my invention, I claim:

Heat exchange apparatus particularly for aircraft use comprising headers having a large number of small-diameter unflanged holes spaced by webs of header material which are narrow in comparison with the hole diameter, thin-wall tubes carried by the headers having their ends projecting beyond the outer surfaces of the headers, a predetermined amount of high-melting bonding agent peripherally bonding each tube to the headers, the projecting tube ends each being expanded into polygonal configuration with the edges of adjacent tube ends in line contact and without intervening spaces, to minimize head resistance, and a casing secured and sealed to said headers.

JOHN E. WOODS.